United States Patent [19]

Buerger

[11] 4,192,004

[45] Mar. 4, 1980

[54] TOPOLOGICAL TRANSFORMATION SYSTEM

[76] Inventor: Walter R. Buerger, 20920 Anza Ave., Apt. 4-107, Torrance, Calif. 90503

[21] Appl. No.: 831,390

[22] Filed: Sep. 8, 1977

[51] Int. Cl.² .............................................. G06F 15/20
[52] U.S. Cl. .................................... 364/518; 364/515
[58] Field of Search ........................ 364/514, 515, 518; 340/146.3 F, 146.3 Q, 146.3 H, 146.3 MA

[56] References Cited

U.S. PATENT DOCUMENTS

| 3,976,982 | 8/1976 | Eiselen | 364/515 |
| 4,005,385 | 1/1977 | Joynson et al. | 340/146.3 MA |
| 4,060,713 | 11/1977 | Golay | 364/515 |

OTHER PUBLICATIONS

Gilbert et al.: A Real Time Hardware System for Digital Processing of Wide-Band Video Images, IEEE Transactions on Computers, vol. C-25, No. 11, Nov. 1976, pp. 1089-1100.
Duff et al.: A Cellular Logic Array for Image Processing, Pattern Recognition, vol. 5, pp. 229-247, Pergamon Press, Sep. 1973.

*Primary Examiner*—Felix D. Gruber
*Attorney, Agent, or Firm*—Fulwider, Patton, Rieber, Lee & Utecht

[57] ABSTRACT

A topological transformation system for transforming and extracting data from distributed images in n-dimensional spaces. The system is disclosed in two-dimensional form as principally comprising an iterative array of logical cells, each of which may be used to contain duplicates of each element of the distributed image. The duplicates are translatable with respect to each other simultaneously in all possible directions, and comparisons may be made at each translational step between the current image and previous or transformed versions of the image. An example is described for deriving the center points of holes in a two-dimensional image, and a four-dimensional iterative array is also disclosed.

11 Claims, 10 Drawing Figures

TOPOLOGICAL TRANSFORMATION SYSTEM

BACKGROUND OF THE INVENTION

The present invention relates in its most general sense to n-dimensional spatial, or spatial and temporal, data distribution analysis systems. More particularly, the invention relates to such devices capable of monitoring and controlling progressive analysis through sequential topological transformations in metric spatial models. In a more limited sense, the invention relates to systems for recognizing and extracting form features and their spatial relationships in a two-dimensional visual field.

Presently available information processing systems leave considerable room for improvement in their abilities to provide spatial/temporal data distribution form and feature analyses, especially for forms with more than two dimensions. Such systems have application in a wide range of areas, including complex problems in relativity physics, field theory, and time-variant systems modeling, as well as more fundamental problems of volumetric and planar image analyses.

Various classes of form analysis devices have been proposed for performing certain spatial/temporal operations of data reduction. In general, however, such devices have distinct and significant limitations in the ranges of practical problems to which they can be applied. Apart from practical limitations involving processing speed, size, and cost, a particularly common limitation in form analysis devices is sensitivity to only a limited range of form features, as contrasted with a more universal sensitivity to a wide range of features or form trends. Accordingly there is a clear need for a spatial/temporal data processing device capable of handling a wide range of problems at a rapid data rate and within reasonable size and cost limitations. The present invention is directed to these and other related ends.

SUMMARY OF THE INVENTION

The present invention resides in a method and related apparatus for performing analysis by transformation of data distributions residing in topological n-dimensional metric spaces. The occupied space to be analyzed by transformation is first transduced into a form suitable for storing in a recording medium, and this recorded representation is copied into a set of essentially duplicate transformation media modules. The space to be analyzed may be a two-dimensional visual field, a three-dimensional volumetric space, or a more complex n-dimensional space. In its broader sense as a topological transformation system, the invention involves the steps of performing controllable, sequential transformations on the data recorded in the transformation media modules, and recording the transformation results over any selected increment or period of progress. The invention also provides for iterative retransformation of prior analysis results.

In terms of two-dimensional analysis, the invention provides a mechanism for analyzing form and feature characteristics of a visual image, wherein single or multiple pairs of copies of an original image are simultaneously shifted, i.e. translated or displaced, over each other in opposing directions, while the sequential changes in edge transition overlap between the respective image copy pairs are monitored by stationary sensing arrays. Depending upon the type of transformation desired, various chosen pairs of copies of the original image may be shifted at uniform rates along straight or curved lines, or may be shifted along such lines in a periodic or non-periodic fashion. The choice of a particular path or mode of shifting may be based on the results of some previous transformation result, and monitoring arrays may form new base images for further transformation and analysis, or may make immediate analysis conclusions based on the progress of data flow in the system.

In more specific terms, the apparatus of the invention as it relates, by way of example, to two-dimensional analysis, comprises means for transforming an image of a visual field into binary form, and into an interconnected iterative array of cells, there being one cell for each binary element derived from the image of the visual field. Each cell of the array comprises four primary storage blocks, two for each dimension, and a plurality of secondary storage blocks associated with each primary storage block. Controllable data paths are provided between each primary block and its associated secondary blocks, and between the primary blocks of each cell and the corresponding primary blocks of adjacent cells in the array. In each cell, one primary block is associated only with right-shifting information, the second primary block is associated with left-shifting information, the third primary block is associated with up-shifting information, and the fourth primary block is associated with down-shifting information.

A parametric threshold converted binary derivation of the visual image is first loaded into all four primary storage blocks of each cell, so that the array contains essentially four duplicate images of the original visual image. Then, depending upon the requirements of the particular application, the four images are shifted with respect to each other. In a simple application for locating the center lines or center points of features in the image, one pair of images is translated, each with respect to the other, toward the left and right, respectively, while simultaneously the second pair of images is translated in the up and down directions, respectively. The secondary storage blocks are utilized for storage of such information as the previous contents of the cell, and, at each translational step, comparisons may be made between the present and previous content of the cells, so that transitions from white to black, or black to white, may be detected and stored in other secondary blocks.

In a presently preferred embodiment of the invention, the iterative array, together with the data transfers between intercellular blocks and between iterative cells of the array, are all controlled by a control code generating means which generates a sequence of multi-bit digital control signals for transmission to the iterative array and its associated apparatus. The apparatus of the invention may also include display means for displaying selected transformed results from the array, or other output forms by which further systems may access and utilize the output data for control of other devices, or in other desired applications. Both the display or output control means and the means for accessing and loading the original visual field may be controlled by the same control means as the iterative array.

By way of example of an n-dimensional transformation system, where n is greater than two, another embodiment of the invention takes the form of a four-dimensional array having a cell structure similar to the aforedescribed two-dimensional array, but including eight primary storage blocks in each cell, and further including additional data paths for communicating between the primary and secondary blocks associated with the various dimensions.

It will be appreciated from the foregoing summary that the present invention represents an important advance in many fields relating to the analysis of data distributions residing in topological n-dimensional metric spaces. In addition, the invention has significant impact in more specific areas, such as the transformation of two-dimensional visual images, and the extraction of features and spatial relationships from those images. Other aspects and advantages of the present invention will become apparent from the following more detailed description, taken in conjunction with the accompanying drawings.

BRIEF DESCRIPTION OF THE DRAWINGS

FIG. 4b is a timing diagram showing a typical change of state in the storage block of FIG. 4a;

DESCRIPTION OF THE PREFERRED EMBODIMENTS

The present invention is principally concerned with providing an extremely versatile system for performing analysis by transformation of data distributions residing in topological n-dimensional metric spaces. The system may be configured to handle any desired number of dimensions, and may be easily adapted to handle a wide variety of topological transformation problems and analyses. For purposes of illustration, a two-dimensional system is described in detail herein, but it will be readily appreciated that the same concepts may be easily expanded to any desired number of dimensions. In this regard, a four-dimensional system is also illustrated and described.

There are many fields of application which require the manipulation of spatial, or spatial and temporal, images in n-dimensional space, either to transform the images into another form which negates or adds some type of distortion, or to extract form and feature characteristics of the images, or reach some conclusion with regard to their spatial and temporal relationships.

Figure 1:
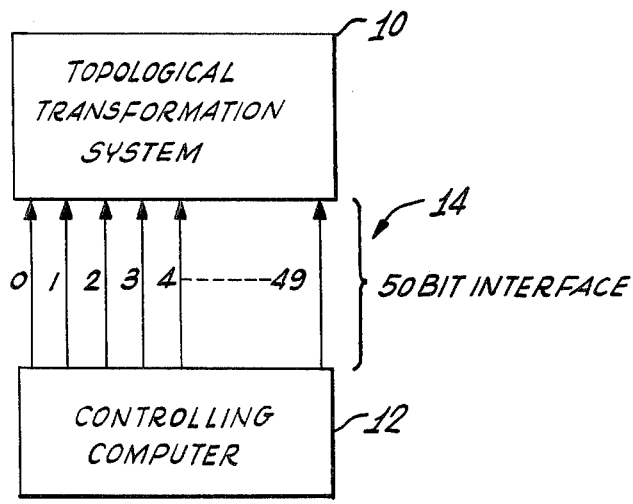
FIG. 1 is a simplified block diagram showing the relationship of the topological transformation system of the invention with a controlling computer.

As shown in FIG. 1, a presently preferred embodiment of the invention comprises a topological transformation system, indicated by reference numeral 10, and a controlling computer 12 which communicates with the topological transformation system (hereinafter TTS) through a digital interface 14. The number of bits required for communication in parallel through the interface 14 will, of course, depend upon the number of dimensions employed in the TTS 10, and on a number of other factors relating to the requirements of the application and the cost constraints involved. In the two-dimensional system described herein, a fifty-bit interface is employed. The controlling computer 12 could be replaced by any type of controller capable of generating a sequence of fifty-bit codes to control the TTS 10. Using the computer 12, however, has the advantage that the TTS can be readily adapted to handle different types of problems merely by executing a different program in the computer, to produce a different sequence of fifty-bit codes at the interface 14. In the embodiment disclosed herein, the controlling computer 12 may be any general purpose machine having the facility to output fifty bits to a parallel interface, and the computer is controlled by means of a FORTRAN program designed specifically to solve a given problem with the TTS.

Figure 2:
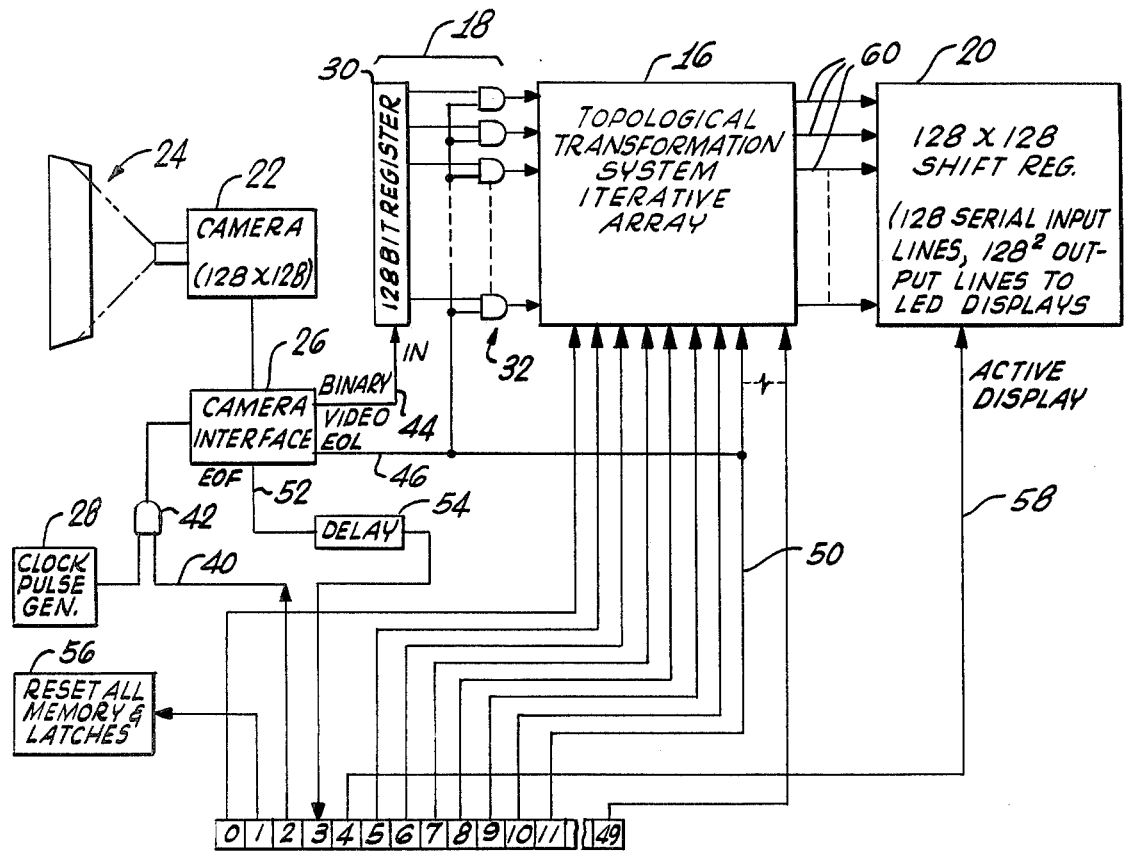
FIG. 2 is a more detailed block diagram of the topological transformation system of FIG. 1.

As shown in FIG. 2, the TTS 10 comprises a TTS iterative array 16, which will shortly be defined in detail, data input logic 18, and a display matrix 20. Also shown is a video camera 22 focused on a scanned field 24, a camera interface 26, and a clock pulse generator 28. In the illustrative embodiment, the camera produces a binary image matrix having one hundred and twenty-eight elements on each side, i.e., 128×128. For example, General Electric Model TN 2200 Solid-State Automation Camera, together with a General Electric PN 2110A interface, would perform the function required. As will be further described, the TTS iterative array 16 has a total of 16,384 cells (128×128), as does the display matrix 20. The input circuitry 18 comprises a serial-in-parallel-out shift register 30 of 128 bits length, together with 128 AND gates 32.

As can be seen from FIG. 2, some of the digital control codes transferred through the interface 14 are utilized to control operations of the camera 22 and display 20. For example, control code #2 is transmitted over line 40 to an AND gate 42, by means of which the clock pulse generator 28 is enabled to transmit clock pulses to the camera interface 26, thereby initiating operation of the camera and transfer of binary video information over line 44 from the camera interface to the shift register 30. The camera interface 26 generates an end-of-line signal on line 46 after each 128 bits of video information, and this is utilized to enable each of the AND gates 32, and thereby transfer one line of information from the shift register 30, through the AND gates to the iterative array 16.

The end-of-line signal on line 46 is also connected to the control code #11 line 50, which, it will be seen, is utilized to command the iterative array to shift its contents one position to the right. Binary video information continues to be fed to the shift register 30, and transferred line-by-line to the iterative array 16, until an entire field has been transferred. At this point, an end-of-field signal is generated on line 52 from the camera interface 26 and, after a delay, indicated at 54, the end-of-field signal is made available on control code #3, the only digital input for interrogation by the controlling computer 12. Thus, the controlling computer 12 can determine when an entire field of information has been transferred to the iterative array 16. Before starting the input operation, the controlling computer 12 outputs control code #1, which, as indicated at 56, resets all memory cells in the iterative array 16 and all control latches in the system.

Control code #4 is transmitted by line 58 to the display matrix 20, and enables the entire display matrix. Information in the array 16 may be selectively shifted to the right by commands from the controlling computer 12, over control code #11, thereby shifting information into the display matrix 20 over lines 60. The display matrix 20 comprises 128 shift registers, each of which is 128 bits long and has a separate display element, such as a light emitting diode, for each bit. Control codes #0 and #5–49 are all connected to the iterative array 16, and have special meanings associated with the control of the array.

Figure 3:
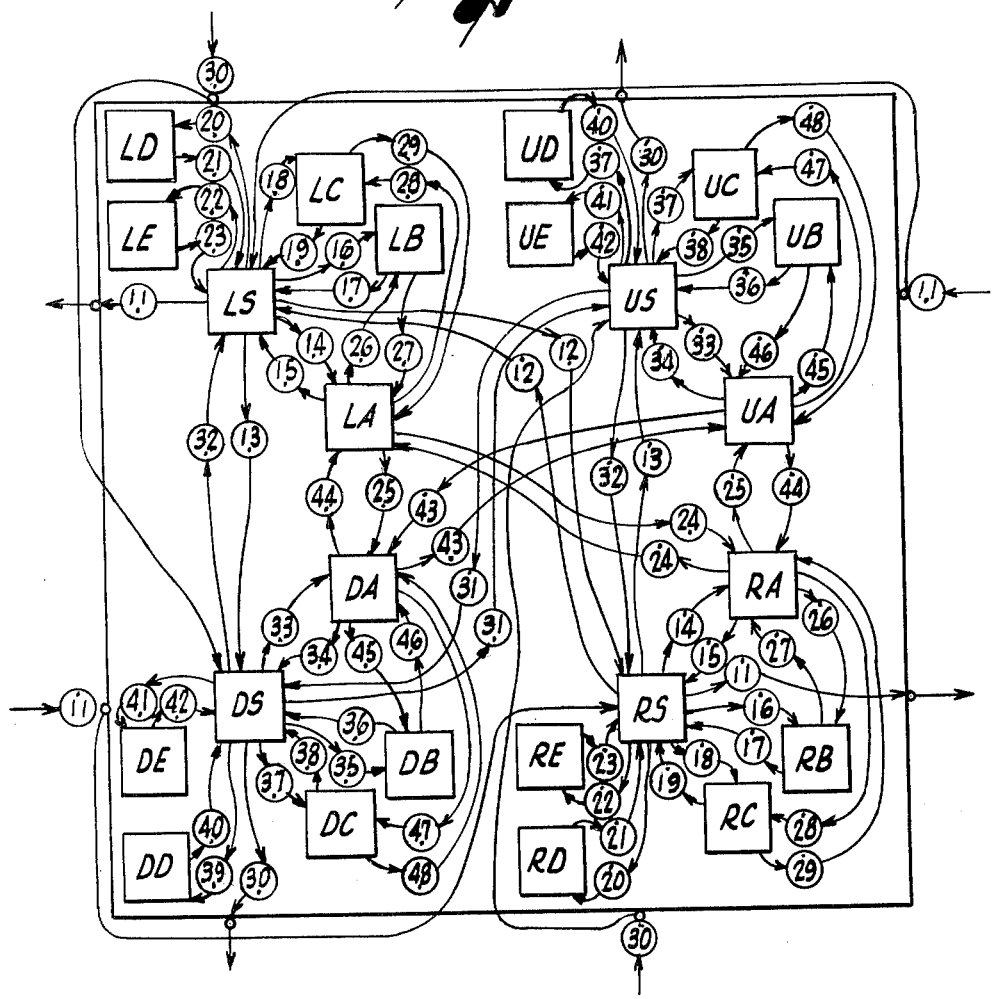
FIG. 3 is a simplified block diagram of one cell of the iterative array of the topological transformation system, showing the primary and secondary storage blocks in the cell, and the available data paths for transfer of data between blocks and from cell to cell.

The iterative array 16 comprises 16,384 identical cells, one of which is illustrated diagramatically in FIG. 3. Each cell contains four primary storage blocks, indicated by the symbols LS, RS, US, and DS. As will shortly become apparent, each cell also includes the circuitry shown in FIG. 6 for monitoring the storage blocks for transitions from one state to another. The storage blocks shown in FIG. 6, (e.g., LS, RS, US and DS) are identical with corresponding storage blocks bearing the same symbols in FIG. 3. The first letter of the pair of letters designating each primary storage block indicates the direction of shift, i.e. incremental translation or displacement, with which the storage block is associated. Thus, LS is a left storage block, RS is a right storage block, US is an up storage block and DS is a down storage block. Each primary storage block is connected by a gated unidirectional path directed to its counterpart in the adjacent cell and in the direction with which the block is associated. For example, the LS block is connected by a gated unidirectional path to the LS block in the cell immediately to the left. Thus, the LS block may transfer its contents to the LS block in the cell immediately to the left. By the same token, an LS block may simultaneously receive data from the LS block immediately to its right. Similarly, the RS block is connected by a unidirectional path directed to its counterpart in the cell immediately to the right, the US is connected by a unidirectional path to its counterpart in the cell immediately above, and the DS block is connected by a unidirectional path to its counterpart in the cell immediately below. Likewise, cells from the opposite directions simultaneously transfer data to the indicated source cells along extensions of the same unidirectional paths.

By appropriate sequential selection of these unidirectional paths, data images stored in selected iterative array memory blocks may be translated along selected trajectories, i.e., sequential increments of displacement tracing out desired routes. It will be noted that the data images are stored in complementary displacement pairs, such as the images represented in the LS and RS blocks. Complementary image pairs will be moved in respect to each other in equal and opposite increments and directions, henceforth referred to as contravariant displacement of the image pairs.

It will be noted that each of these unidirectional paths is designated by a number in a circle, and that the number has a dot above or below it. These numbers in circles correspond to the control code numbers of digital information received from the controlling computer 12, where each number represents a signal which appears simultaneously in all iterative cells, at all points where the number is shown. The dot position is related to another control command from the controlling computer. Control code #0 determines whether the "upper dot" commands or the "lower dot" commands are executed. If control code #0 is a 0, upper dot commands are executed, and if control code #0 is a 1, lower dot commands are executed. By way of example, if control codes 0 and 11 were set to 1, the lower dot 11 command would be executed, which means that the path indicated by numeral 11 with a lower dot would be enabled. It will be seen that this is the path directed from the LS block toward the left out of the cell, and to an adjacent LS block. If control code #0 were to be 0 and control code #11 a 1, the upper dot 11 command would be executed, i.e., the path from the RS block to the right out of the cell would be enabled. Another of the command codes, #49, instructs the array to execute both upper dot and lower dot commands together. Thus, if command code #49 were to be a 1 and command code #11 were to be a 1, both the upper dot and lower dot 11 commands would be executed together, i.e., the LS blocks would be shifted to the left, and the RS blocks would be simultaneously shifted to the right. It can be seen from an examination of FIG. 3 that similar paths exist for the US and DS blocks and that these are also controllable by appropriate switching of the control codes.

For each of the primary storage blocks, LS, RS, US and DS, there are five secondary storage blocks also each designated by two alphabetic symbols, the second letters of which are A, B, C, D and E, respectively. Thus, the secondary blocks relating to primary block LS are LA, LB, LC, LD, and LE. Similarly, the other secondary storage blocks are RA, RB, RC, RE and RD; UA, UB, UC, UD and UE; and DA, DB, DC, DD and DE. It will be seen that there are other gated data paths between the primary and secondary blocks. In particular, there are bi-directional paths between each S block and its corresponding A, B, C, D and E blocks, and there are also bi-directional paths between the A and B blocks and between the A and C blocks. It will also be seen that there are bi-directional paths between primary blocks LS and DS, LS and RS, and US and RS. Each interblock path within a cell is gated by means of a combination of control codes from the controlling computer 12.

Basically, the iterative array 16 is utilized to perform topological transformations of images by first loading its primary storage blocks with data derived from a scanned field such as the field 24, as described in connection with FIG. 2. It will be seen that the image data will be shifted into the array 16 by successively right-shifting the array 128 times until all of the RS blocks contain the image. The image can then be duplicated in the other primary storage blocks, LS, US, and DS, by an internal transfer of data to these blocks. At this point, there will be four duplicate images of the scanned field in the array 16, and the array can then be manipulated in any desired manner. The secondary storage blocks, i.e., the A, B, C, D and E blocks, can be used for storing such information as the previous contents of the cell or the results of some comparison between the previous and present contents of the cell, or any other use. In the relatively simple example to be described in detail, the original image is simultaneously left-, right-, up-, and down-shifted, and simultaneous comparisons are made between the present and previous content of each cell to determine when the transitions occur between 1's and 0's representing contrasting colors or shades, such as darker gray and lighter gray, in the original image.

However, before proceeding with a description of such a problem and its solution, the individual block and gate elements utilized in each cell will be described in further detail.

Figure 4A:
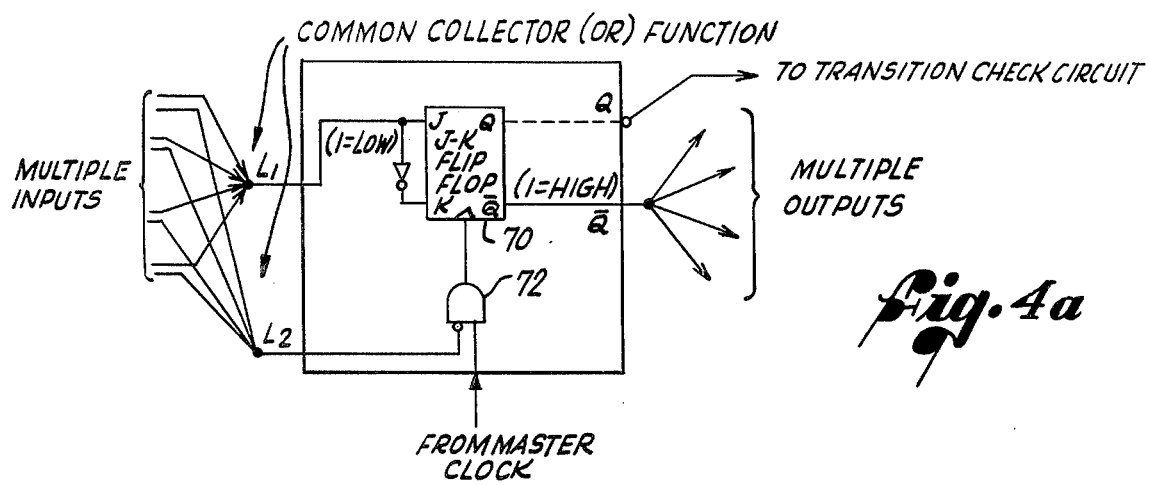
FIG. 4a is a detailed schematic diagram of a storage block used in a cell of the iterative array.
Figure 4B:
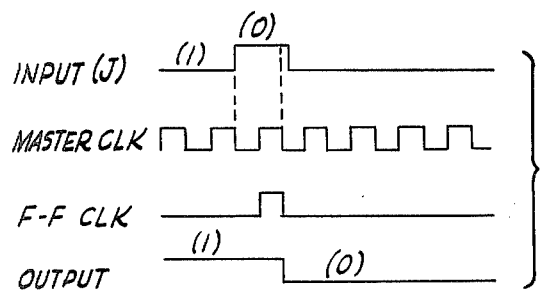

FIG. 4a shows a storage block, such as the primary storage blocks LS, RS, US, and DS, or such as any of the secondary storage blocks. Basically, each block merely comprises a J-K flip-flop and an AND gate with one inverted input. Multiple inputs to the block which, as was seen in connection with FIG. 3, can be derived from any of a number of other blocks, are connected in common to the J terminal of the flip-flop 70, and the multiple outputs from the block are derived from the $\overline{Q}$ terminal. There are actually two lines, designated L1 and L2 respectively, associated with each multiple input. As will shortly be explained, the signal on L2 is derived from a control code line associated with a numbered gate in the input path. The L2 signal is a "0" only when the control code associated with the gate is a "1". The L2 line is connected to the inverted input terminal of the AND gate 72, the other input of which is derived from a master clock used to control data transfers throughout the system. Thus, a "1" from the control code signal will enable clock signals to be gated to the J-K flip-flop. The Q output of the flip-flop 70 is also brought out to a terminal, as shown by the broken line 76, and this is used in a transition check circuit to be described in relation to FIG. 6. As shown in the timing diagram of FIG. 4b, when the J input changes state from logical 1, indicated by a low voltage signal, to a logical 0, indicated by a higher voltage signal, this has no immediate effect on the outputs of the flip-flop until a full clock cycle later, when a falling edge of the clock pulse effects a transition of the $\overline{Q}$ output from high to low, i.e., from logical 1 to logical 0. It will be noted that there is a polarity inversion from the input to the output of the entire block, but that there is a similar inversion in each of the gates to be described in relation to FIG. 5.

Figure 5:
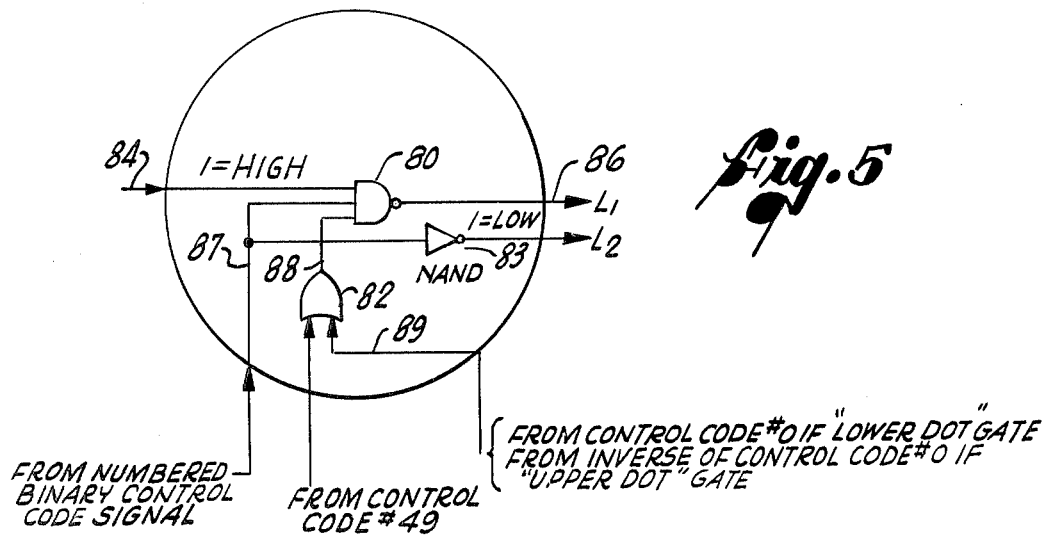
FIG. 5 is a detailed schematic diagram of a numbered data path gate shown in the cell diagram of FIG. 3.

Each of the numbered gates used to transfer information within each cell, and to shift information between cells, is illustrated in detail in FIG. 5. Each gate comprises a NAND gate 80, an OR gate 82 and an inverter 83. The path to be gated enters on line 84 as one of three inputs to the NAND gate 80 and leaves on line 86 as the single (L1) output from the NAND gate. A second output from the numbered gate is provided on line L2, which is derived from the output of the inverter 83, the input of which is supplied from the control code signal on line 87. A second input to the NAND gate 80 is a line 87 from the numbered binary control code signal, i.e., from the digital interface 14 (FIG. 2). The third input to the NAND gate 80 is required for the control of upper dot and lower dot numbered commands and is derived from the output of OR gate 82. The inputs of OR gate 82 are derived from control code #49 and control code #0. Thus, it will be seen that if control code #49 is a 1, the third input on line 88 to the NAND gate will also be a 1, and the NAND gate will produce the required inverted output on line 86, so long as the appropriate numbered binary control code signal appears on line 87. If, however, control code #49 is a 0, a logical 1 on line 89 from control code #0 will be required before the NAND gate 80 can produce the required inverted output on output line 86. As indicated in FIG. 5, line 89 is provided with one of two possible connections. If the gate in question is a lower dot command, the signal on line 89 is derived directly from control code #0, as transferred at digital interface 14. If, however, the gate in question is an upper dot gate, the signal on line 89 is derived from the inverse of control code #0. Thus, it will be seen that the state of control code #0 also determines whether the NAND gate 80 in enabled or not. If control code #0 is a 0, the gate will be enabled if it is an upper dot gate, and if control code #0 is a 1, the gate will be enabled if it is a lower dot gate.

The numbered gates, having numbers 11–49, all have the form shown in FIG. 5, and the functions of these gates are all defined in appendix A to this specification, which sets forth all of the control codes from 0 through 49. Appendix A lists the shift or transfer operation to which each of the numbered gates 11–49 is related. For example, control code #11 is listed as "RS.S.RS & LS.S.LS". This indicates that the RS block is shifted (S stands for shift) to the adjacent RS block, and that the LS block is shifted to the adjacent LS block. Of course, it will be understood from the listing that the RS shifts are upper dot commands and the LS shifts are lower dot commands, and that if bit 49 is also a 1, both the RS and LS shifts will be performed simultaneously. By way of further example, control code #12 is listed as "RS.T.LS & LS.T.RS". This indicates that the upper dot #12 command transfers the RS block to the LS block, and the lower dot #12 command transfers the LS block to the RS block. If both upper dot and lower dot commands are executed together, there would be an exchange of the contents of RS and LS. All of the other commands 11–48 are listed in similar fashion.

The commands 0–4 have been already discussed, and it only remains to discuss the special nature of the command codes numbered 5–10. Command code #5 has the effect of comparing a previous right/left and up/down match with a current right/left and up/down match condition, to check for a white to black transition either in the right/left sense or the up/down sense. The meaning of this will become clearer from a consideration of FIG. 6, which is illustrative of circuitry contained within each cell for purposes of checking for white/black or black/white transitions, as a pair of images is translated, one in one direction and the other in the opposite direction. As already discussed with reference to FIG. 4a, each storage block includes a J-K flip-flop. The symbols J, Q and $\overline{Q}$ in the storage blocks shown in FIG. 6 refer to the data terminals of the flip-flop, specifically the J input terminal, i.e. the one to which multiple inputs L1 are connected in FIG. 4a, and the Q and $\overline{Q}$ output terminals. Although each cell shown in FIG. 3 also includes the circuitry of FIG. 6, the connections between the data terminals of the storage blocks and the remainder of the FIG. 6 logic have been omitted from FIG. 3 for clarity. Before FIG. 6 can be meaningfully discussed, however, it has to be understood that, in the sequences of commands, yet to be discussed, for shifting the images in the primary storage blocks, a command is included to copy the contents of the primary storage blocks into the corresponding A blocks. Accordingly, RA can be employed to contain the previous value of RS, LA to contain the previous value of LS, UA to contain the previous value of US, and DA to contain the previous value of DS.

Figure 6:
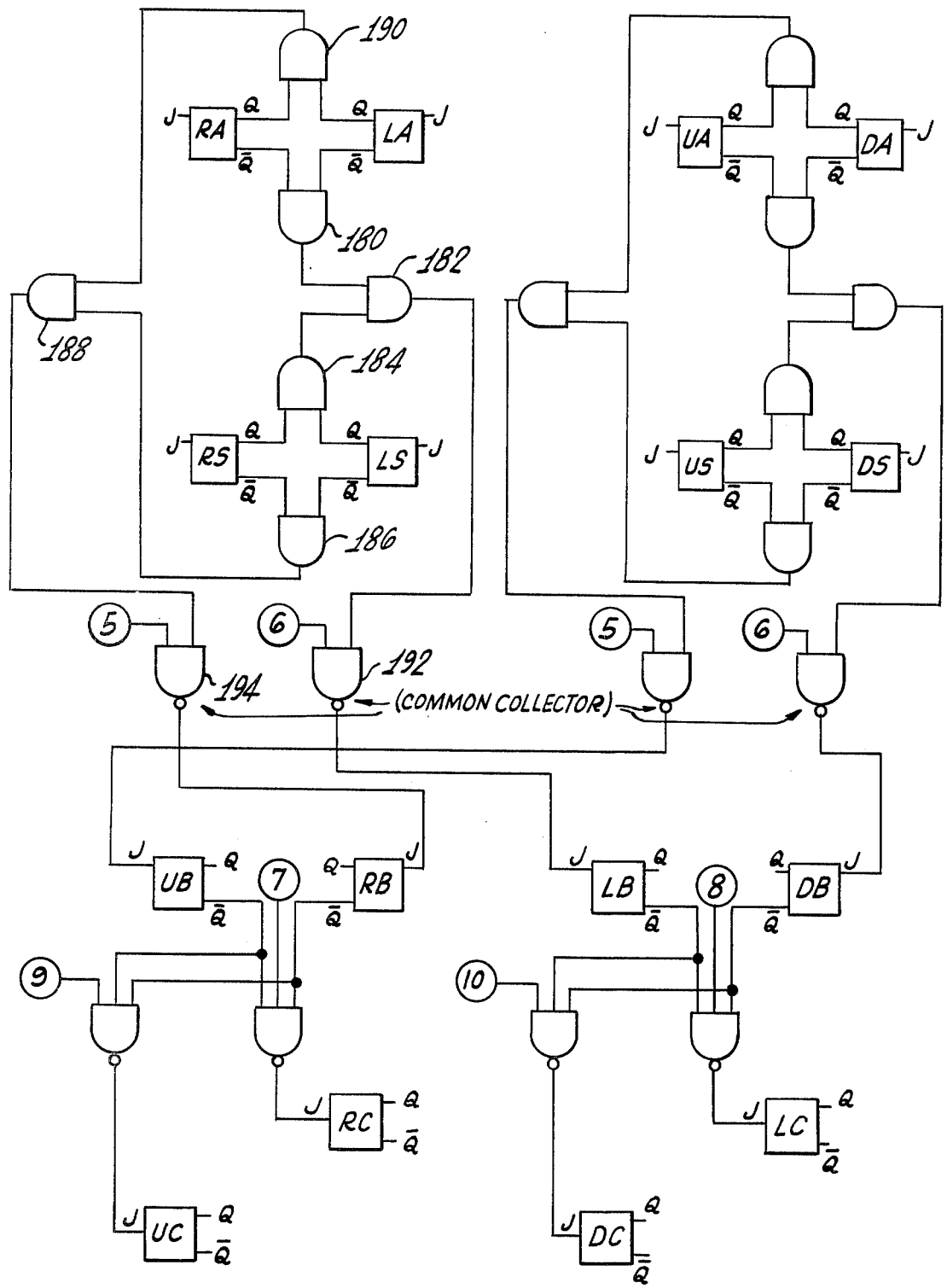
FIG. 6 is a logic diagram of circuitry included in each cell for checking for transitions from one state to another; and, FIGS. 7a–7c together illustrate the cell structure which is required, in addition to the cell structure shown in FIG. 3, to complete a four-dimensional array.

In accordance with the FIG. 6 logic, the contents of RA and LA are ANDed together in AND gate 180 and the result is presented as an input to AND gate 182. Similarly, the inverse contents of RS and LS are ANDed in AND gate 184 and presented as a second input into AND gate 182. Thus, to obtain a 1 output from AND gate 182 requires that the present values of RS and LS should be 0 and the previous values, stored in RA and LA, should be 1. Thus, a 1 output from AND gate 182 indicates a transition from overlap of the RS and LS images to non-overlap of the RS and LS images, where overlap is defined as both images having 1's in the same cell location. In a similar fashion, the contents of RS and LS are ANDed in AND gate 186 and transmitted as an input to yet another AND gate 188, and the inverted contents of RA and LA are ANDed in AND gate 190 and presented as a second input to AND gate 188. It will be appreciated that a 1 output from AND gate 188 occurs only when the present values of RS and LS are 1's and the previous values, stored in RA and LS, are 0's, i.e., a 1 output from AND gate 188 occurs when there is a transition from 0's to 1's, or from non-overlap to overlap of the RS and LS images.

The output from AND gate 182 is connected as an input to NAND gate 192, the other input of which is derived from control code #6. Similarly, the output of AND gate 188 is connected as an input to NAND gate 194, the other input of which is derived from control code #5. If a 0 bit in an image is arbitrarily defined as white, and a 1 bit is arbitrarily defined as black, it will be seen that a white-to-black transition will result in an inverted or 0 signal being output from NAND gate 194, if control code #5 is a 1. This inverted output is stored as a logical 1 in the RB block. Thus, the RB block in each cell contains a 1 if there has been a white-to-black transition at that particular cell location. In similar fashion, the output of AND gate 182, which indicates a black-to-white transition, is connected as an input to NAND gate 192, the other input of which is derived from control code #6. A black-to-white transition results in a 1 being stored in the LB block. Similar and parallel logic is provided for detecting white-to-black and black-to-white transitions in the US and DS blocks. A white-to-black transition results in a 1 being stored in the UB block, and a black-to-white transition results in a 1 being stored in a DB block. The control codes #7 and #9 can then be utilized to perform logical AND operations on the UB and RB blocks, so that when there is a simultaneous white-to-black transition in the same cell location, a 1 will be stored in a selected secondary storage block. When control code #7 is a 1, and when there is a white-to-black transition in both the up/down and left/right senses, a 1 will be stored in the RC block. Control code #9 performs the same AND operation, but stores the result in the UC block. Similarly, when there is a black-to-white transition in both directions, control code #8 stores a 1 in the LC block and control code #10 stores a 1 in the DC block.

The particular program defined in Appendix B to this specification by way of example, is described in its listing as a "hole finder". What it does is to shift the four duplicate images of the originally scanned field, simultaneously in four directions. The program is written in FORTRAN IV compiler language, and is believed to be readily understandable by anyone familiar with any FORTRAN compiler. It is also believed that the program is simple enough in structure that a flow chart would be superfluous. The program is comprised of a number of subroutines, the function of which is clear in each case from comments accompanying the program listing. The first sub-routine is designated "CLEARALL", in which the array 16 is cleared, and the next subroutine is entitled "CAMERA", in which the camera image is loaded into the iterative array 16. The operative subroutine is entitled "HOLES" and consists of twenty-three calls to a subroutine which performs a shifting operation in all four directions, without making any comparison of cell content after each shift. Then there follows a pair of calls to another subroutine, which does the same shifting process, but which makes a transition check by activating control codes 5 and 6 and bringing the logic of FIG. 6 into play. To understand the significance of the transitions that are being detected, it is only necessary to appreciate that if there is a hole, i.e., a circular area containing all 0's, in the image, the cell at a position corresponding to the original center of the hole will contain 0's until the right and left images have been shifted a full hole-diameter with respect to each other. Then there will be a transition at the center point from 0 to 1. A similar transition will occur in the up/down sense, and a logical combination of these will produce the exact center point. When the center points of the holes have been thus determined, they may be output to the display matrix 20 by right-shifting the entire array 128 times.

It will be appreciated that other more complex programs may be readily devised to manipulate data into the array 16. Further examples are shown in Appendices C and D.

Figure 7A:
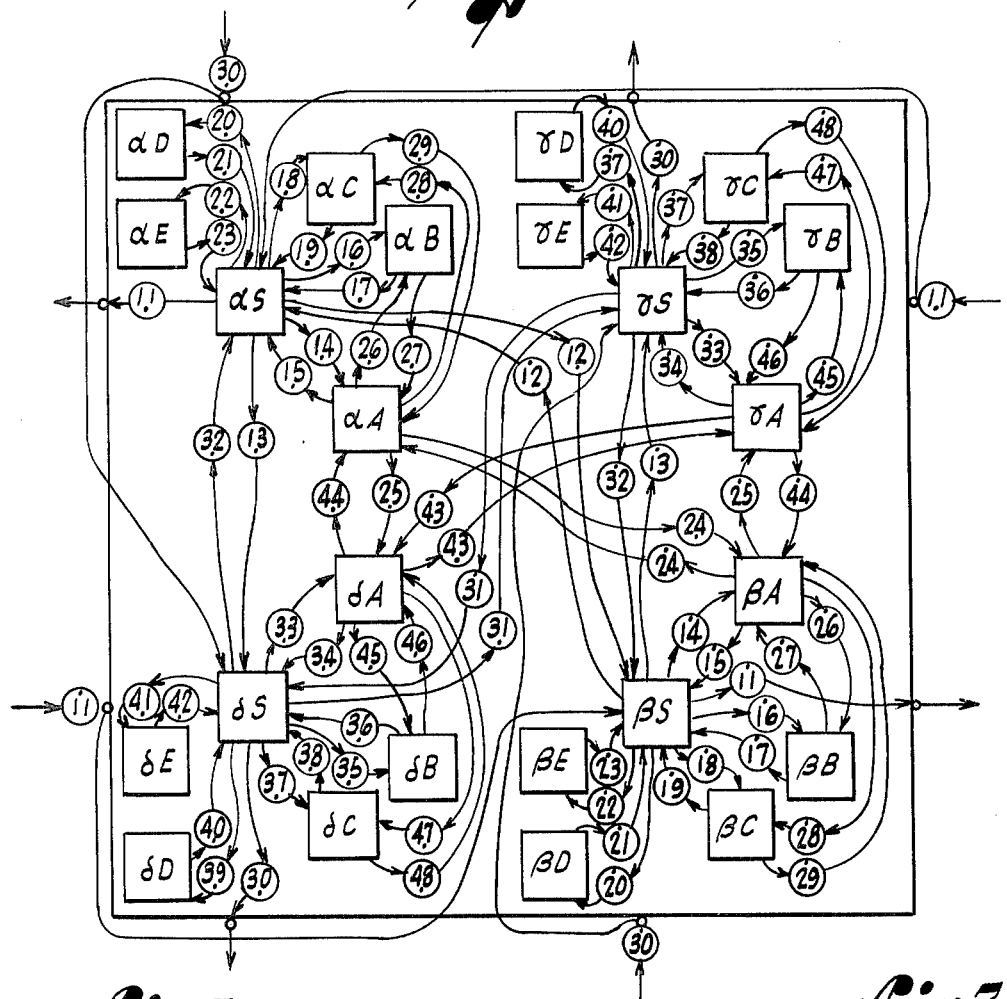
Figure 7B:
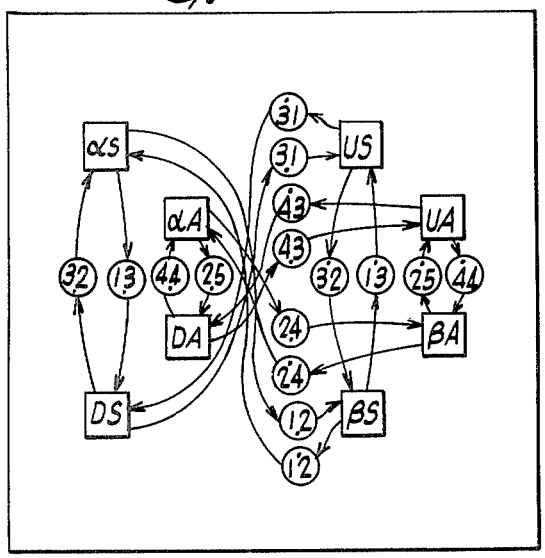
Figure 7C:
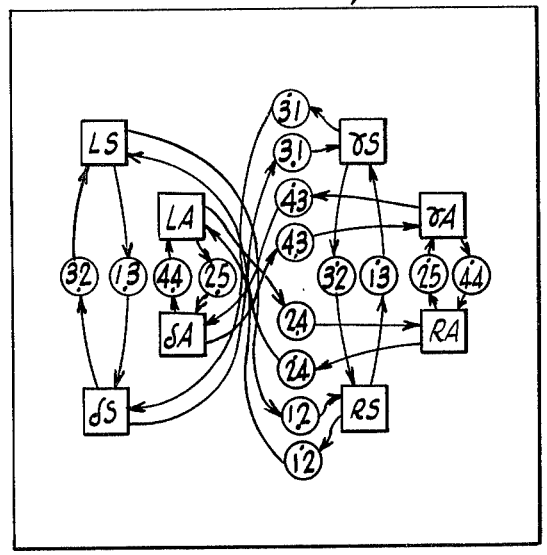

FIGS. 7a–7c, taken together with FIG. 3, illustrate the structure of a four-dimensional iterative array similar in arrangement to the two-dimensional array of FIG. 3. It will be seen that FIG. 7a shows a further two-dimensional array in which the left direction has been replaced by an $\alpha$ direction, the right direction has been replaced by a $\beta$ direction, the up direction has been replaced by a $\gamma$ direction, and the down direction has been replaced by a $\delta$ direction. FIGS. 3 and 7a taken together represent a four-dimensional iterative array cell. All that is required in addition is to establish some data paths between the first two and second two dimensions. This is effected by the structure of FIGS. 7b and 7c, which show two-way paths being established between $\alpha$S and DS, US and $\beta$S, LS and $\delta$S and RS and $\gamma$S. Similarly, paths are established between the A blocks of the four respective dimensions. It will be appreciated from the foregoing description of the two-dimensional array, that the four-dimensional array defined by FIG. 3 and FIGS. 7a–7c can be operated in much the same manner, utilizing a very similar command structure to that used with the two-dimensional array. Expansion to even more than four dimensions is only a matter of further duplication of the primary and secondary storage blocks and their interconnecting paths.

It will be appreciated from the foregoing description that the present invention provides an extremely powerful tool for the transformation and extraction of data from images distributed in n-dimensional spaces, whether they be of two or more dimensions. Moreover, the relatively simple parallel nature of the TTS array defined in this specification results in relatively fast parallel processing of information, and can also result in relatively low manufacturing costs. It will also be appreciated that various modifications may be made to the system without departing from the spirit and scope of the invention. Accordingly, the scope of the invention is not to be limited except as by the appended claims.

APPENDIX A

TTS CONTROL CODES AS SHOWN IN TYMSHARE FORTRAN OUTPUT
(USE HANDY GUIDE IN ENVELOPE FOR EACH DECODING)

50 BINARY FIELDS = 1 COMPLETE INTERFACE WORD (NOT ALL FIELDS NEED TO BE
   ACTIVE OR WIRED IF THEY WILL NOT BE USED IN A PARTICULAR APPLICATION)

```
 # CODE     DEFINITION

0 STAGR:   "0" CAUSES "UPPER DOT COMMANDS" (RIGHT HAND COLUMN FOR FIELDS
              11-48 BELOW) TO BE EXECUTED WHEN THE FIELD BIT IS ON (=1).
            "1" CAUSES "LOWER DOT COMMANDS" (RIGHT HAND COLUMN FOR FIELDS
              11-48 BELOW) TO BE EXECUTED.
 1 RSTAL:   RESET ALL TTS MEMORIES AND LATCHES
 2 CAMST:   CAMERA START (STARTS TRANSFER OF 1 128*128 FRAME FROM CAMERA TO TTS)
 3 CAMDN:   CAMERA DONE (AN OUTPUT LATCH SET WHEN TTS FRAME IS LOADED)
 4 ACCRT:   ACTIVATE THE CRT DISPLAY TO SHOW RESULTS
 5 CMPWB:   COMPARE PREVIOUS R/L & U/D MATCH WITH CURRENT R/L & U/D MATCH
            FOR CONCURRENT R/L OR CONCURRENT U/D WHITE TO BLACK TRANSITION,
            AND STORE 1 FOR R/L TRANSITION IN RB, AND 1 FOR U/D TRANSITION
            IN UB.
 6 CMPBW:   (SAME AS 5, BUT FOR BLACK TO WHITE TRANSITION WITH 1'S STORED IN
 7 CURBC:   "AND" RB AND UB AND STORE RESULT IN RC.
 8 CDLBC:   "AND" LB AND DB AND STORE RESULT IN LC.
 9 CRUBC:   "AND" RB AND UB AND STORE RESULT IN UC.
10 CLDBC:   "AND" LB AND DB AND STORE RESULT IN DC.

UPPER       LOWER
           DOT         DOT
           COMMANDS    COMMANDS

11 HSSHS:  RS.S.RS  &  LS.S.LS
12 HSTHS:  RS.T.LS  &  LS.T.RS
13 HSTVS:  RS.T.US  &  LS.T.DS
14 HSTHA:  RS.T.RA  &  LS.T.LA
15 HATHS:  RA.T.RS  &  LA.T.LS
16 HSTHB:  RS.T.RB  &  LS.T.LB
17 HBTHS:  RB.T.RS  &  LB.1.LS
18 HSTHC:  RS.T.RC  &  LS.T.LC
19 HCTHS:  RC.T.RS  &  LC.T.LS
20 HSTHD:  RS.T.RD  &  LS.T.LD
21 HDTHS:  RD.T.RS  &  LD.T.LS
22 HSTHC:  RS.T.RE  &  LS.T.LE
23 HCTHS:  RE.T.RS  &  LE.T.LS
24 HATHA:  RA.T.LA  &  LA.T.RA
25 HATVA:  RA.T.UA  &  LA.T.DA
26 HATHB:  RA.T.RB  &  LA.T.LB
27 HBTHA:  RB.T.RA  &  LB.T.LA
28 HATHC:  RA.T.RC  &  LA.T.LC
29 HCTHA:  RC.T.RA  &  LC.T.LA
30 VSSVS:  US.S.US  &  DS.S.DS
31 VSTVS:  US.T.DS  &  DS.T.US
32 VSTHS:  US.T.RS  &  DS.T.LS
33 VSTHA:  US.T.UA  &  DS.T.DA
34 VATVS:  UA.T.US  &  DA.T.DS
35 VSTVB:  US.T.UB  &  DS.T.DB
36 VBTVS:  UB.T.US  &  DB.T.DS
37 VSTVC:  US.T.UC  &  DS.T.DC
38 VCTVS:  UC.T.US  &  DC.T.DS
39 VSTVD:  US.T.UD  &  DS.T.DD
40 VDTVS:  UD.T.US  &  DD.T.DS
41 VSTVE:  US.T.UE  &  DS.T.DE
42 VETVS:  UE.T.US  &  DE.T.DS
43 VATVA:  UA.T.DA  &  DA.T.UA
44 VATHA:  UA.T.RA  &  DA.T.LA
45 VATVB:  UA.T.UB  &  DA.T.DB
46 VBTVA:  UB.T.UA  &  DB.T.DA
47 VATVC:  UA.T.UC  &  DA.T.DC
48 VCTVA:  UC.T.UA  &  DC.T.DA
49 NSTGR:
49 NSTGR:  "NO STAGGER SHIFT": MULTIPLEXES ALL PAIRS OF UPPER DOT AND LOWER
```

DOT COMMANDS TOGETHER (CAUSES BOTH FIELDSO OPTIONS TO BE TRUE,
ALLOWING FOR ONE SYSTEM CYCLE EXCHANGE BETWEEN 2 MEMORY CELLS
WHEN DESIRED.
* IN CONTROL CODE OUTPUTS, THE FOLLOWING SYMBOLS CONVERT TO CAUSE THEIR
RESPECTIVE FIELDS' JK LATCHES TO DO THE FOLLOWING:
0: LATCH PROVIDES A 0 TO THE TTS CONTROL
1: LATCH PROVIDES A 1 TO THE TTS CONTROL
S: LATCH RETAINS THE "SAME" (ITS PREVIOUS) STATE FOR TTS CONTROL
T: LATCH "TOGGLES" TO THE COMPLEMENT OF ITS PREVIOUS STATE
FOR TTS CONTROL

* IN DEFINITIONS 11-48 (UPPER DOT COMMANDS & LOWER DOT COMMANDS):
RS,RA,RB,RC,RD,RE,LS,LA,LB,LC,LD,LE,US,UA,UB,UC,UD,UE,DS,DA,DB,DC,DE
REFER TO THE RESPECTIVE LABLED MEMORY CELLS IN FIG.4A, WHERE S
SUFFIXED CELLS CAN TRANSFER DATA BETWEEN OR WITHIN BLOCKS, WHILE
A,B,C,D,E SUFFIXED CELLS ONLY TRANSFER DATA WITHIN A GIVEN BLOCK.

THE FORM @@.@.@@ INDICATES A DATA TRANSFER FROM THE MEMORY CELL
INDICATED ON THE RIGHT TO THE MEMORY CELL INDICATED ON THE LEFT,
WHERE T INDICATES A TRANSFER WITHIN A GIVEN BLOCK BETWEEN 2
DIFFERENTLY LABLED MEMORY CELLS, AND S INDICATES A SHIFT TRANSFER
BETWEEN 2 S SUFFIXED CELLS IN THEIR STANDARD SHIFT DIRECTION.
IN PROGRAMS, X IS SOMETIMES SUBSTITUTED FOR T INDICATING AN
"EXCHANGE", OR IN OTHER WORDS, 2 SIMULTANEOUS T COMMANDS SUCH
AS FIELDS 18 AND 19 TOGETHER BEING CALLED "HSXHC", MEANING
HSTHC AND HCTHS AT THE SAME TIME.

* IN THE CODES 11-48: THE SAME 3 PART GROUPING IS USED WITH THE DEFINITION
LABELS, BUT WITH THE DIVIDING DOTS DELETED.  H REFERS TO THE
HORIZONTALLY ORIENTED SHIFTING CELL GROUPS R (RIGHT) AND L (LEFT),
AND V REFERS TO THE VERTICALLY ORIENTED SHIFTING CELL GROUPS
U (UP) AND D (DOWN), AND INDICATE THAT THE OPPOSING SHIFT GROUPS
ARE SELECTED AND OPERATED IN ACCORDANCE WITH THE STATUS OF THE
"STAGR" CONTROL CODE #0 (THE STAGGER SHIFT CONTROL LATCH).

APPENDIX B

```
RENUMBER
>LIST
   1           C:****************************************************************
   2           C:****************************************************************
   3           C:******HOLE FINDING PROGRAM EXAMPLE************************
   4           C:****************************************************************
   5           CALL CLEARALL
   6           CALL CAMERA
   7           CALL HOLES
   8           CALL DISPLAYC
   9           END
  10           C:****************************************************************
  11           C:****************************************************************
  12           C:***FORTRAN LEVEL SUBROUTINES                                 ***
  13           C:****************************************************************
  14           SUBROUTINE CLEARALL
  15           C:     ** CLEAR ALL TRANSFORM PLANE I/O'S**
  16           CALL TS@RESETALL
  17           CALL TS@0
  18           RETURN
  19           END
  20           C:
  21           C:****************************************************************
  22           SUBROUTINE CAMERA
  23           C:     ** TRANSFORM MATRIX LOADING EXAMPLE **
  24           STRING A(40), B(1)
  25           C:      * A '1' TRIGGER OUTPUT TO 'LOADSTART' INITIATES
  26           C:      *   THE IMAGE LOADING SEQUENCE FROM THE CAMERA.
  27           CALL TS@CAMSTARTON
  28           CALL TS@0
  29     10    FORMAT(S49)
  30     20    READ(0,10) A
```

```
 31            B = SUBSTR3(A,4,1)
 32            IF (B.EQ.'1') GO TO 30
 33            GO TO 20
 34     30     CONTINUE
 35            C:       * LOAD L,U,D, FROM R
 36            CALL TM@LUD
 37            RETURN
 38            END
 39            C:
 40            C:*************************************************************
 41            SUBROUTINE HOLES
 42            C:       ** HOLE FINDING ROUTINE **
 43            C:        * THIS ROUTINE PLACES A 1 IN EACH C MEMORY WHERE
 44            C:        *   THE GEOMETRIC CENTER OF A 25 MIL HOLE EXISTS,
 45            C:        *   AND LEAVES ALL OTHER C MEMORY LOCATIONS AS BEFORE.
 46            C:        *   'I' = THE SIZE RANGE OF THE HOLE DIAMETERS
 47            C:        *    WHICH WILL TRIGGER A 1 IN THE C MEMORIES
 48            C:        *    WHEN THEY ARE GATED ON.
 49            C:        * 1 TRANSFORM PLANE MATRIX POSITION = 1 MIL.
 50            DO 10 I = 1, 23, 2
 51            CALL TS@SHIFT90C
 52     10     CONTINUE
 53            DO 20 I = 24, 26, 2
 54            CALL TM@SHIFT90CMC
 55     20     CONTINUE
 56            RETURN
 57            END
 58            C:
 59            C:*************************************************************
 60            SUBROUTINE DISPLAYC
 61            C:       ** CRT DISPLAY ROUTINE **
 62            C:         * THIS ROUTINE TRANSFERS THE CONTENTS OF THE 128*128
 63            C:         *   TRANSFORM MATRIX C MEMORIES TO THE 128*128 CRT
 64            C:         *   DISPLAY GRID, SHOWING THE RELATIVE SPATIAL LOCATIONS
 65            C:         *   OF HOLE CENTERS FOUND (C MEMORY 1'S).
 66            CALL TS@HSXHC
 67            C:       * SHIFT OUT 128 COLUMNS IN PARALLEL TO THE CRT MEMORY
 68            DO 10 I = 1, 128
 69            CALL TS@HSSHS
 70     10     CONTINUE
 71            C:       * TURN ON THE CRT DISPLAY
 72            CALL TS@ACTCRT
 73            RETURN
 74            END
 75            C:
 76            C:*************************************************************
 77            C:*************************************************************
 78            C:*** TM@...:  TTS MACRO LEVEL SUBROUTINES              ***
 79            C:*************************************************************
 80            SUBROUTINE TM@LUD
 81            C:       * RS.T.LS
 82            WRITE(1,10) '0000000000001000000000000000000000000000000000000'
 83            C:       * HSTVS
 84            WRITE(1,10) '0000000000001000000000000000000000000000000000000'
 85            WRITE(1,10) '1000000000001000000000000000000000000000000000000'
 86     10     FORMAT(S49)
 87            RETURN
 88            END
 89            C:
 90            C:*************************************************************
 91            SUBROUTINE TM@SHIFT90CMC
 92            C:       * HSSHS, HSTHA, VSSVS, VSTVA
 93            WRITE(1,10) '0000000000100100000000000001001000000000000000000'
 94            C:       * COMPARE H & V W/B, B/W
 95            WRITE(1,10) '0000011000000000000000000000000000000000000000000'
 96            C:       * COMPARE H & V W/B, B/W
 97            WRITE(1,10) '0000001100000000000000000000000000000000000000000'
 98            C:       * STAGGER SHIFT, HSSHS, HSTHA, VSSVS, VSTVA
 99            WRITE(1,10) '1000000000100100000000000001001000000000000000000'
100            C:       * COMPARE W/B, COMPARE B/W
101            WRITE(1,10) '0000011000000000000000000000000000000000000000000'
```

```
102            C:      * COMPARE H & V W/B, B/W
103            WRITE(1,10) '0000000110000000000000000000000000000000000000000'
104     10     FORMAT(S49)
105            RETURN
106            END
107            C:
108            C:***************************************************************
109            C:***************************************************************
110            C:*** TS@...:   TTS SINGLE STEP LEVEL SUBROUTINES         ***
111            C:***************************************************************
112            SUBROUTINE TS@RESETALL
113            C:      * RESET ALL TTS
114            WRITE(1,10) '0100000000000000000000000000000000000000000000000'
115     10     FORMAT(S49)
116            RETURN
117            END
118            C:
119            C:***************************************************************
120            SUBROUTINE TS@0
121            C:      * ( ALL = 0 )
122            WRITE(1,10) '0000000000000000000000000000000000000000000000000'
123     10     FORMAT(S49)
124            RETURN
125            END
126            C:
127            C:***************************************************************
128            SUBROUTINE TS@CAMSTARTON
129            C:      * CAMERA START = 1
130            WRITE(1,10) '0010000000000000000000000000000000000000000000000'
131     10     FORMAT(S49)
132            RETURN
133            END
134            C:
135            C:***************************************************************
136            SUBROUTINE TS@SHIFT90C
137            C:      * HSSHS, HSTHA, VSSVS, VSTVA
138            WRITE(1,10) '0000000000010010000000000000001001000000000000000'
139            C:      * STAGGER SHIFT, HSSHS, HSTHA, VSSVS, VSTVA
140            WRITE(1,10) '1000000000010010000000000000001001000000000000000'
141     10     FORMAT(S49)
142            RETURN
143            END
144            C:
145            C:***************************************************************
146            SUBROUTINE TS@HSXHC
147            C:      * HSXHC
148            WRITE(1,10) '0000000000000000001100000000000000000000000000000'
149     10     FORMAT(S49)
150            RETURN
151            END
152            C:
153            C:***************************************************************
154            SUBROUTINE TS@HSSHS
155            C:      * HSSHS
156            WRITE(1,10) '0000000000010000000000000000000000000000000000000'
157     10     FORMAT(S49)
158            RETURN
159            END
160            C:
161            C:***************************************************************
162            SUBROUTINE TS@ACTCRT
163            C:      * ACTCRT = 1
164            WRITE(1,10) '0000100000000000000000000000000000000000000000000'
165     10     FORMAT(S49)
166            RETURN
167            END
        >
```

APPENDIX C

WITH CODE #49 ON, REPETITIONS OF THE FOLLOWING SEQUENCE OF SINGULAR CONTROL CODES ON WILL CAUSE THE TTS TO TRANSLATE AN IMAGE PAIR OVER A 6 ELEMENT HIGH & WIDE SQUARE WAVE CONTRAVARIANT TRAJECTORY PAIR:

```
CONTROL CODE
    BIT #

11  HSSHS:  RS.S.RS  &  LS.S.LS
11  HSSHS:  RS.S.RS  &  LS.S.LS
11  HSSHS:  RS.S.RS  &  LS.S.LS
13  HSTVS:  RS.T.US  &  LS.T.DS
30  VSSVS:  US.S.US  &  DS.S.DS
30  VSSVS:  US.S.US  &  DS.S.DS
30  VSSVS:  US.S.US  &  DS.S.DS
32  VSTHS:  US.T.RS  &  DS.T.LS
11  HSSHS:  RS.S.RS  &  LS.S.LS
11  HSSHS:  RS.S.RS  &  LS.S.LS
11  HSSHS:  RS.S.RS  &  LS.S.LS
13  HSTVS:  RS.T.VS  &  LS.T.DS
31  VSTVS:  US.T.DS  &  DS.T.US
30  VSSVS:  US.S.US  &  DS.S.DS
30  VSSVS:  US.S.US  &  DS.S.DS
30  VSSVS:  US.S.US  &  DS.S.DS
31  VSTVS:  US.T.DS  &  DS.T.US
32  VSTHS:  US.T.RS  &  DS.T.LS
```

APPENDIX D

WITH CODE #49 ON, REPETITIONS OF THE FOLLOWING SEQUENCE OF PAIRS OF CONTROL CODES ON WILL CAUSE THE TTS TO TRANSLATE 2 IMAGE PAIRS AT 45° TO THE TTS AXES, WHERE 2 CONTRAVARIANT TRAJECTORY PAIRS WITH TRACE OUT AN "X" (AS OPPOSED TO THE HOLEFINDER TRAJECTORY PAIRS TRACING OUT A "+"):

```
CONTROL CODE
    BIT #

11 & 30  HSSHS & VSSVS:  RS.S.RS & LS.S.LS  WITH  US.S.US & DS.S.DS
13 & 32  HSTVS & VSTHS:  RS.T.US & LS.T.DS  WITH  US.T.RS & DS.T.LS
11 & 30  HSSHS & VSSVS:  RS.S.RS & LS.S.LS  WITH  US.S.US & DS.S.DS
13 & 32  HSTVS & VSTHS:  RS.T.US & LS.T.DS  WITH  US.T.RS & DS.T.LS
```

I claim:

1. A topological transformation system for transforming and analyzing data distributions residing in topological n-dimensional metric spaces, said system comprising:

transducer means for converting a data distribution in an n-dimensional space into electrical signals;

an iterative array of storage cells, wherein each cell represents one elemental portion of the original space and each cell contains a plurality of storage block pairs which hold pairs of elements of duplicate images;

means for inputting said electrical signals, representative of the original data distribution, to said iterative array;

means for manipulating the contents of said iterative array by simultaneously translating contained duplicate pairs of images of the data distribution in a multiplicity of contravariant or opposing directions along preplanned trajectories in the n-dimensional space, to allow transformation of the data distribution into another form; and, means for comparing the contents of storage block pairs within a cell during translation of the duplicate image pairs, and thereby detecting features relating to forms within or the topology of the original data distribution;

where n is an integer such as 1, 2, 3 or 4.

2. A topological transformation system as set forth in claim 1, wherein:

each of said cells includes 2n primary storage blocks and a plurality of secondary storage blocks associated with each primary storage block;

each of said primary storage blocks is associated with a different particular direction of shifting; and, said means for manipulating includes means for transferring data from each of said primary storage blocks to its counterpart in an adjacent cell in the direction with which said primary storage block is associated, and means for transferring data between each of said primary storage blocks and each of said associated secondary storage blocks;

whereby the duplicate images may be initially stored in said primary storage blocks, then shifted in as many as 2n different directions simultaneously in a predefined manner along predetermined trajectories, said secondary storage blocks being employed to store intermediate results or values representative of prior cell content, and whereby said means for comparing may be employed to extract information concerning the form and features of the original image.

3. A topological transformation system as set forth in claim 2, wherein said means for transferring data includes:
data path means providing a plurality of paths between corresponding ones of said primary storage blocks and between each of said primary storage blocks and its associated secondary storage blocks;
gate means coupled to each of said data path means to control flow of data therethrough; and,
control means to provide an appropriate sequence of control signals to said gate means, to effect transfer of data from cell to cell and between storage blocks within each cell.

4. A two-dimensional image-processing system comprising:
a two-dimensional iterative array of storage cells, wherein each cell initially represents one discrete binary element of a two-dimensional image, and each cell contains four primary storage blocks, each of which is associated with a different shifting direction, and a plurality of secondary storage blocks associated with each primary storage block;
means for transferring data from each of said primary storage blocks to its counterpart in an adjacent cell in the direction with which the primary storage block is associated;
means for transferring data between each of said primary storage blocks and its associated secondary storage blocks; and
means for comparing data in said primary and secondary storage blocks and storing comparison results in one of said secondary storage blocks;
whereby duplicates of the original image can be stored in said four primary storage blocks, then shifted in four directions simultaneously and compared to determine particular form and feature characteristics of the original image, and wherein separate step sequences may use combinations of the four directions to create data trajectories of various directions and routes;
and wherein said means for transferring and said means for comparing each include gated interconnection means coupled to said primary and secondary storage blocks, and said system further includes control means for generating sequences of control signals to control said gated interconnection means in a desired sequence to effect shifting and comparison of the image duplicates stored in said array.

5. A two-dimensional image-processing system as set forth in claim 4, wherein:
each of said primary and secondary storage blocks includes a flip-flop for storing one bit of data; and,
said gated interconnection means comprises a plurality of AND-type gates, each of which is enabled by a specific signal line from said control means, thereby to pass data from one block to another.

6. Apparatus for performing transformations on two-dimensional images, said apparatus comprising:
means for transducing the image into a set of binary electrical signals;
an iterative array of identical storage cells, each of which can represent one discrete element of the image and each of which contains four primary storage cells and four equal pluralities of secondary storage cells associated respectively with each of said primary storage cells;
means for inputting said binary electrical signals to a first set of primary storage cells of said array;
means for transferring data from cell to adjacent cell, simultaneously in a plurality of selected trajectories through corresponding primary storage blocks of adjacent cells;
means for transferring data between storage blocks within said cells;
comparison means, for comparing data in storage blocks within said cells;
gating means to control said means for transferring data and said comparison means; and,
control means for generating digital signals to control said gating means, and thereby to control said means for transferring data and said comparison means;
whereby the original image can be duplicated in all four primary storage blocks, then shifted and compared to transform the original image and to extract features therefrom.

7. Apparatus as set forth in claim 6, wherein said control means is a programmable computer.

8. A topological transformation system for transforming and analyzing data distributions residing in topological n-dimensional metric spaces, said system comprising:
transducer means for converting a data distribution in an n-dimensional space into electrical signals;
a set of storage media pairs, wherein each element thereof represents one portion of the original space and each element possesses an associated means of recording activities related to it;
means for inputting said electrical signals, representative of the original data distribution, to said storage media pairs;
means for manipulating the contents of said storage media pairs by simultaneously translating contained duplicate pairs of images of the data distribution in a multiplicity of contravariant or opposing directions along preplanned trajectories in the n-dimensional space, to allow transformation of the data distribution into another form; and,
means for comparing the contents of the recording means associated with an element during translation of the various contravariant image pairs, and thereby detecting features relating to forms within or the topology of the original data distribution;
wherein n is an integer such as 1, 2, 3 or 4.

9. A method for analyzing a two-dimensional image to locate images of holes, said method comprising the steps of:
storing a two-dimensional image in electrical form in an iterative array of storage cells each of which has four primary storage blocks and a plurality of secondary storage blocks;
copying the image into all four primary storage blocks to provide four copies of the image;
shifting the four image copies simultaneously in four respective directions, one cell at a time, by shifting the contents of each primary storage element to its counterpart in the adjacent cell in the direction of shifting;

comparing on each shift the content in each cell of the left- and right-shifted images and of the up- and down- shifted images, to determine overlap or non-overlap of the images;

determining on each such shift and for each cell whether there was a transition from an overlapping to a non-overlapping condition, or vice versa, for both the left- and right-shifted images and the up- and down-shifted images;

recording such transitions in one of said secondary storage blocks to indicate centers of holes in an up/down and a left/right sense;

logically combining the transitions to determine the exact hole centers; and, displaying the results in a display device.

10. A method as set forth in claim 9, and further comprising the step of:

initially shifting the four copies simultaneously in the four respective directions, by a preselected number of shifts, without any comparing step on each of such initial shifting steps.

11. A method for analyzing a two-dimensional image to locate images of holes, said method comprising the steps of:

clearing the contents of a two-dimensional iterative array of storage cells;

loading the iterative array with data obtained from a two-dimensional camera image, wherein each storage cell is employed to store a single picture element of the image;

copying each picture element of the image into duplicate storage blocks in each cell to produce four duplicate images in the array of cells;

shifting the images in four respective directions by a predetermined number of picture elements;

shifting the images by one further picture element and immediately comparing the current content of each cell with its previous content;

detecting transitions between overlapping and non-overlapping pairs of images by logically combining the results of said shifting and comparing step;

repeating said shifting and comparing step and said detecting step until a transition defining the location of a hole center is detected.

* * * * *